United States Patent [19]

Luxa et al.

[11] 3,988,645

[45] Oct. 26, 1976

[54] LAMINAR INSULATING MATERIAL FOR ELECTRICAL APPARATUS

[75] Inventors: Günther Luxa; Johannes Kirch, both of Berlin, Germany

[73] Assignee: Siemens Aktiengesellschaft, Munich, Germany

[22] Filed: Aug. 14, 1975

[21] Appl. No.: 604,835

[30] Foreign Application Priority Data

Aug. 16, 1974  Germany............................ 2439838

[52] U.S. Cl..................................... 317/62; 317/61; 317/72; 174/17 VA; 174/17 GF; 174/137 R; 428/311; 428/186

[51] Int. Cl.² ........................................ H02H 3/22

[58] Field of Search .................... 317/61, 62, 70, 72; 174/30, 17 VA, 17 GE, 137 R, 143, 25 R; 428/178, 186, 311

[56] References Cited
UNITED STATES PATENTS

| | | | |
|---|---|---|---|
| 1,130,268 | 3/1915 | Haefely................................ | 174/30 |
| 2,947,903 | 8/1960 | Westrom.......................... | 317/61 X |
| 3,226,593 | 12/1965 | Pittman............................. | 317/61 X |
| 3,248,599 | 4/1966 | Masuda........................... | 174/143 X |
| 3,325,584 | 6/1967 | Herzig.................................. | 174/30 |
| 3,598,688 | 8/1971 | Bellamy.......................... | 428/311 X |
| 3,842,318 | 10/1974 | Nitta..................................... | 317/62 |
| 3,875,466 | 4/1975 | Jakszt.................................. | 317/62 |
| 3,928,705 | 12/1975 | Loft et al............................ | 428/311 |

*Primary Examiner*—J D Miller
*Assistant Examiner*—Patrick R. Salce
*Attorney, Agent, or Firm*—Kenyon & Kenyon Reilly Carr & Chapin

[57] ABSTRACT

The invention is directed to a laminar insulating material for electrical apparatus insulated by a fluid such as an insulating gas or an insulating liquid. The laminar insulating material includes two cover layers which are made of a material of relatively high density and an insulating material of relatively low density which is permeable for the fluid and fills the space between the cover layers.

The invention is particularly well suited for the manufacture of the housings of overvoltage arresters which are arranged in the metal encapsulation of a gas-insulated, high-voltage installation. The laminar insulating material accomplishes here a faultless separation between the insulating gas in the metal encapsulation and that in the overvoltage arrester. Gases which penetrate the cover layers can be led off to the outside from the gas-permeable insulating material.

12 Claims, 4 Drawing Figures

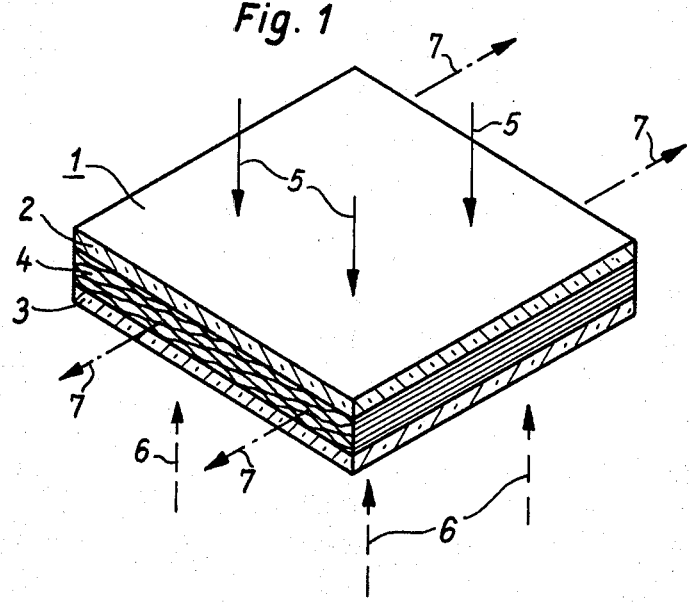
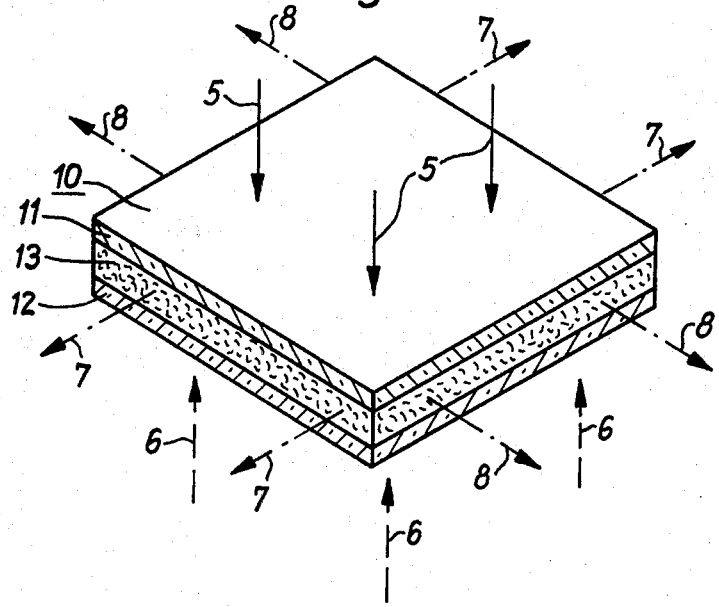

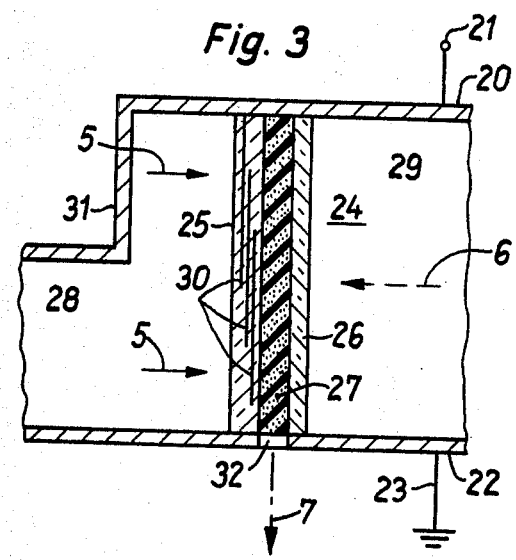
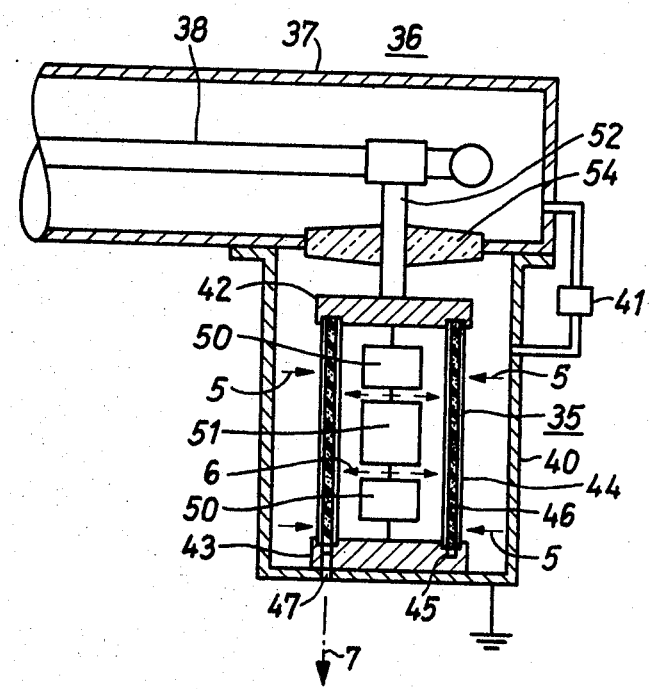

LAMINAR INSULATING MATERIAL FOR ELECTRICAL APPARATUS

BACKGROUND OF THE INVENTION

The invention relates to a laminar insulating material for electrical operating means insulated with a fluid. Materials of this kind are required, for instance, as a partition to divide a gas space within electrical apparatus into several individual spaces. Such insulating materials are subject to stringent requirements particularly if they are stressed not only dielectrically but also mechanically due to a pressure difference; the separated spaces may contain different fluids. Fluids are understood in this connection to be particularly insulating gases and liquids.

It is an object of the invention to provide an insulating material which is particularly well suited for this purpose.

SUMMARY OF THE INVENTION

According to the invention, the insulating material includes two cover layers made of a material of relatively high density and an insulating material of relatively low density which is permeable for the fluids and fills the space between the cover layers. The insulating material disposed between the cover layers absorbs fluids which enter, for instance, due to leaks in the cover layers. A passage of fluids through the entire insulating material is thereby prevented. The fluids that have penetrated into the permeable insulating material can readily be removed through a suitable outlet.

The insulating material permeable for fluids may consist of a laminate with linear porosity. Such a material can be fabricated, for instance, by closely stacking corrugated insulating foil and has a preferred direction for the permeability. This is advantageous if it is desired that fluids which have penetrated into the space between the cover layers of the insulating material, collect at given points.

The insulating material permeable for fluids can be made in a particularly advantageous manner of open-cell, plastic foam material. Foam materials of this kind form, on the one hand, a mechanically stable framework and therefore permit, in conjunction with suitable cover layers, the fabrication of insulating material which can be highly stressed mechanically. On the other hand, there is sufficient permeability for fluids to conduct off penetrating fluids.

In the above embodiments of the invention, that is, with an insulating material permeable for fluids in the form of a laminate or an open-cell plastic foam material, one of the cover layers and/or the insulating material may be provided with conductive inserts and/or an additional material which influences the voltage distribution. In this manner, a voltage distribution useful particularly for the application of the insulating material in high-voltage equipment can be achieved.

The laminar insulating material according to the invention is suited particularly in an application where it serves as a partition between two gas spaces which contain different gases at different pressures, the gas-permeable insulating material being connected to an outlet which leads to the atmosphere surrounding the two gas spaces. The partition may be, for instance, the housing of a gas-filled overvoltage arrester which is arranged inside a vessel filled with another gas. Here, it is important to prevent the passage of gases from the vessel into the overvoltage arrester as well as vice versa. The invention solves this problem in a relatively simple manner by a unified component. In contrast thereto, two insulating cylinders placed inside one another have heretofore been used, whose interspace was connected to the surrounding atmosphere by means of a valve as disclosed, for example, in Deutsche Offenlegungsschrift No. 2,311,281.

Although the invention is illustrated and described herein as LAMINAR INSULATING MATERIAL FOR ELECTRICAL APPARATUS, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 1 is a schematic diagram showing a perspective view of the laminar insulating material according to the invention wherein the intermediate layer is a laminate having a linear porosity.

FIG. 2 is a second embodiment of the laminar insulating material according to the invention wherein the intermediate layer is made of an open-cell plastic-foam material.

FIG. 3 shows the laminar insulating material applied as a partition between two gas spaces.

FIG. 4 is a metal-encapsulated overvoltage arrester having a housing made of the laminar insulating material according to the invention.

DESCRIPTION OF THE PREFERRED EMBODIMENTS OF THE INVENTION

The insulating material 1 in FIG. 1 includes of an upper cover layer 2 and a lower cover layer 3 as well as a laminate 4 which is arranged between these cover layers and forms a gas-permeable insulating material. The cover layers 2 and 3 may consist of an insulating material of relatively high density, for example, laminated paper or fabric, or of a fiberglass fabric which is bonded with hardened epoxy resin. The laminate 4 may consist of high-quality electrical insulating foils which are stacked with parallel corrugations and are joined together at least at some points by a suitable binder to form a solid body. There is likewise a mechanically strong bond between the cover layers 2 and 3 and the laminate 4 which can be accomplished by a hardened resin. The insulating material 1 is therefore a material which can be highly stressed mechanically and electrically.

In FIG. 1, the action on the insulating material 1 by gases and the behavior of the material resulting therefrom are shown by arrows. The solid arrows 5 indicate here the action on the insulating material 1 by a first gas in the direction toward the cover layer 2. The dashed arrows 6 similarly indicate a further gas acting on the cover layer 3. Should the gas 5 or the gas 6 or both gases at the same time penetrate into the laminate 4, be it because one of the gases or both gases diffuse through the cover layers or because the cover layers have a leak, the gas or gas mixture that has penetrated leaves in the direction of the dash-dotted arrows 7. As the laminate 4 has linear porosity, the gas leaves the insulating material only along one axis as indicated in FIG. 1 by the dash-dotted arrows 7. No gas escapes, however, in a direction parallel to the cover plates 2 and 3 and perpendicular to the dash-dotted arrows 7.

Similar to the insulating material according to FIG. 1 the insulating material 10 according to FIG. 2 includes an upper cover layer 11, a lower cover layer 12 and a gas-permeable insulating material 13 arranged between the cover layers. The layers are rigidly connected with each other. In FIG. 2, the gas-permeable insulating layer 13 is an open-cell plastic foam material, which, for instance, may be foamed in between the mutually spaced apart cover layers 11 and 12. However, a layer of a plastic foam material can also be made separately on which the cover layers are subsequently applied by means of a suitable binder.

Similar to FIG. 1, the stress of the insulating material 10 by gases and the behavior of the material are depicted by solid arrows as well as dashed and dash-dotted arrows. In contrast to the insulating material 1, gases which have penetrated into the gas-permeable insulating material 13 in any manner leave the insulating material not only in the direction of the dash-dotted arrows 7, but also perpendicularly thereto, and in any event also parallel to the cover layers 11 and 12 along the dash-dotted arrows 8. This is to indicate at the same time that the insulating material 13 is gas-permeable on all sides.

The arrangement according to FIG. 3 comprises a part 20 which is at high-voltage potential, with a voltage connection 21, as well as a grounded part 22 with a ground connection 23. Between the parts 20 and 22 there is an insulating body 24 which is made of the insulating material according to the invention. Accordingly, the insulating body 24 includes a cover layer 25 as well as a further cover layer 26 and a gas-permeable insulating material 27 disposed between these cover layers. The cover layer 25 is provided with conducting inserts 30. The conducting inserts 30 compensate the influence of a salient corner 31 of the part 20 on the dielectric stress of the insulating part 24 and provide for an approximately uniform stress of the insulating material. The conducting inserts 30 may therefore be arranged in the cover layer 25 in any suitable distribution and number. Instead of the conducting inserts, a conducting or semiconducting additional material may also be contained in the material of the cover layer 25 for providing voltage control. If desired, the gas-permeable insulating material 27 may contain additional materials which are conducting or semiconducting.

In the same manner as in FIGS. 1 and 2, the action on the insulating part 24 is indicated in FIG. 3 by arrows 5 and 6. The possible escape of gas from the gas-permeable insulating material 27 takes place in the direction of arrow 7 through an opening 32 provided in the part 22 at ground potential.

FIG. 4 shows the insulating material according to the invention utilized in an overvoltage arrester 35 for a metal-encapsulated high-voltage installation 36, of which part of the encapsulation 37 of a bus bar 38 is shown in FIG. 4. The overvoltage arrester 35 is disposed in a separate encapsulation 40, which is connected with the encapsulation 37 of the bus bar 38 in a gas-tight manner. The insulating gas can be sulfur hexafluoride for example and is contained under pressure in the encapsulation 37. This insulating gas has access to the interior of the encapsulation 40 through a valve arrangement 41. The overvoltage arrester 35, shown simplified, has a metal fitting 42 and 43 at each end and a housing 44 arranged between these fittings which consists of a tubular insulator body made of the insulating material according to the invention. In the lower fitting 43, there is provided a circular slot 45 which communicates with the gas-permeable insulating material 46 of the housing 44 and from which an outlet 47 leads through the fitting 43 and the wall of the encapsulation 40 to the surrounding atmosphere.

In the interior of the housing 44 are disposed two arc-quenching gaps 50 connected in series with each other as well as a voltage-dependent resistor 51. This schematically illustrated series circuit extends through a feedthrough 54 arranged between the encapsulation 37 and the encapsulation 40 and is connected to the bus bar 38. The ground connection of the overvoltage arrester 35 is formed by the lower fitting 43 which is connected with the encapsulation 40.

In view of the desired operation of the arc-quenching gaps 50, the overvoltage arrester 35 is filled with nitrogen. The housing 44 of the overvoltage arrester 35 therefore separates two housings which may contain different gases under different pressure. The insulating material of the housing 44 prevents the gas in the encapsulation 40 from penetrating into the overvoltage arrester 35 and vice versa, the gas from the overvoltage arrester 35 from penetrating into the encapsulation 40. Should the gases penetrate the inner or outer cover layer of the insulating material, they will get into the gas-permeable insulating material 46 from which they can escape through the outlet 47 to the outside.

As already mentioned, the invention is suited equally well for gas-insulated and liquid-insulated high-voltage equipment. The insulating material according to the invention can further be used as a partition between a space containing an insulating liquid and one containing an insulating gas.

What is claimed is:

1. A fluid-insulated electrical apparatus comprising: first and second metal parts operable at first and second voltage potentials respectively, one of said voltage potentials being greater than the other one of said voltage potentials, said metal parts being separated from each other so as to define a region therebetween filled with the insulating fluid; and, a partition wall extending between said first and second metal parts for separating said region into separate regions on respective sides of said wall, said partition wall being a laminar insulation material including: two mutually adjacent cover layers conjointly defining a space therebetween, each of said cover layers being made of a material having a relatively large density; and, an intermediate insulating material filling out said space between said cover layers and being permeable to the fluid, said intermediate insulating material having a relatively low density.

2. The apparatus of claim 1, said intermediate insulating material being a laminate having a linear porosity.

3. The apparatus of claim 1, said intermediate insulating material being an open-cell plastic foam material.

4. The apparatus of claim 1, one of said cover layers containing conductive inserts therein for influencing the voltage distribution.

5. The apparatus of claim 1, one of said cover layers and said intermediate insulating material each containing conductive inserts for influencing the voltage distribution.

6. The apparatus of claim 1, said intermediate insulating material containing conductive inserts for influencing the voltage distribution.

7. The apparatus of claim 1, one of said cover layers containing an additional material therein for influencing the voltage distribution.

8. The apparatus of claim 1, one of said cover layers and said intermediate insulating material each containing an additional material for influencing the voltage distribution.

9. The apparatus of claim 1, said intermediate insulating material containing an additional material for influencing the voltage distribution.

10. The apparatus of claim 1, wherein said first and second metal parts and said laminar insulating material conjointly defining two gas-filled chambers separated by said laminar insulation material, each of said chambers containing the fluid in the form of a gas different from the gas contained in the other chamber and the gases being at pressures different from each other, and outlet means communicating with said intermediate insulating material for directing any portion of said gases penetrating said cover layers away to the ambient outside of said chambers.

11. The apparatus of claim 1, said first metal part being the enclosure of a gas-filled vessel and operable at the lower one of said voltage potentials, said second metal part being a conductor for carrying the higher one of said potentials; and, an overvoltage arrester arranged inside said vessel, said overvoltage arrestor including a housing made of said laminar insulation material extending between said enclosure and said conductor so as to conjointly define therewith a gas-filled space within said gas-filled vessel.

12. The apparatus of claim 11 comprising: outlet means communicating with said intermediate insulating material for directing any portion of the gas from said gas-filled vessel and from said gas-filled space away to the ambient outside of both said gas-filled vessel and said gas-filled space.

* * * * *